Figure 1:
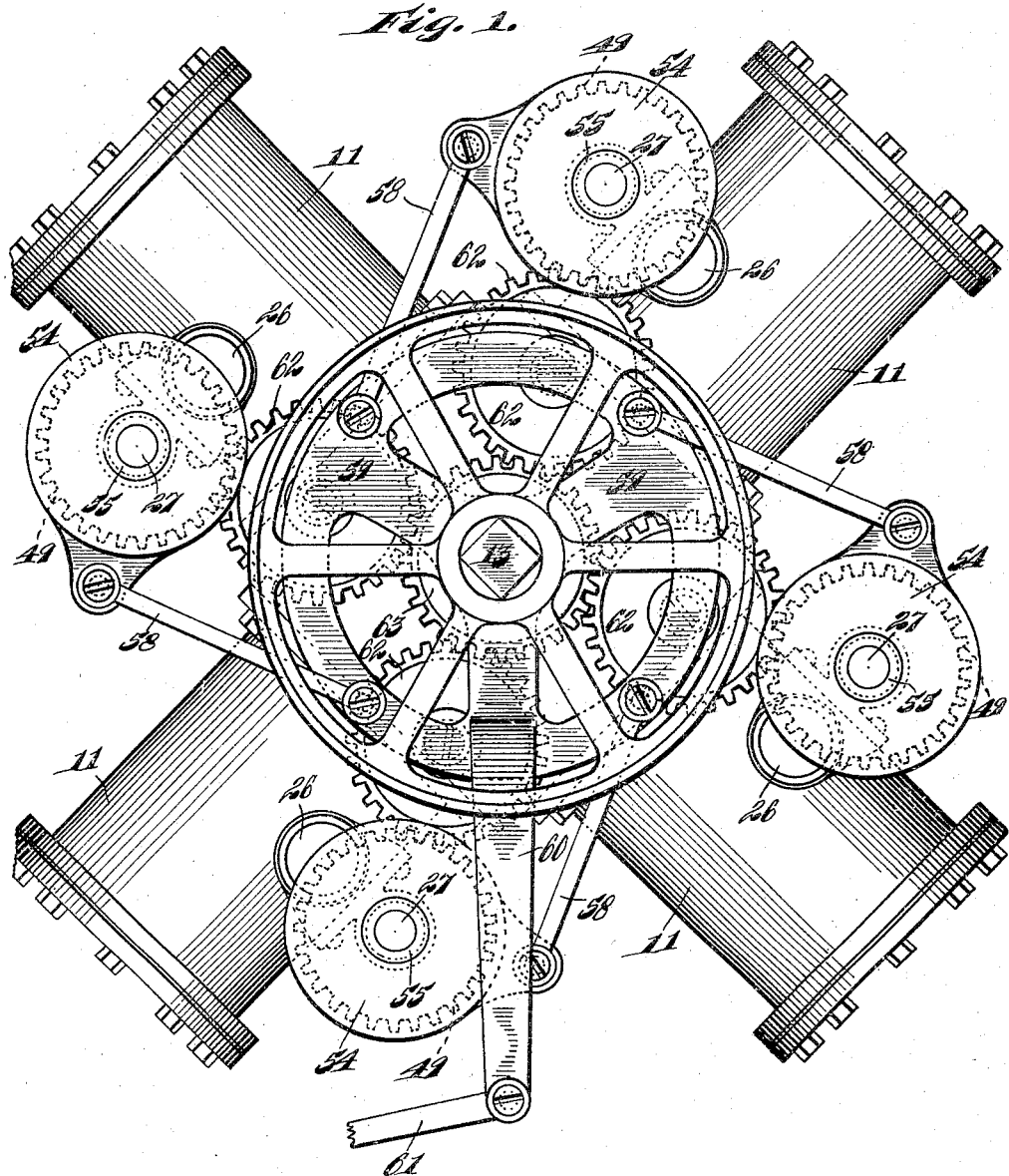

W. W. VANCE.
ROTARY VALVE FOR ENGINES.
APPLICATION FILED NOV. 19, 1914.

1,228,502.

Patented June 5, 1917.
4 SHEETS—SHEET 1.

W. W. VANCE.
ROTARY VALVE FOR ENGINES.
APPLICATION FILED NOV. 19, 1914.
1,228,502.
Patented June 5, 1917.
4 SHEETS—SHEET 2.
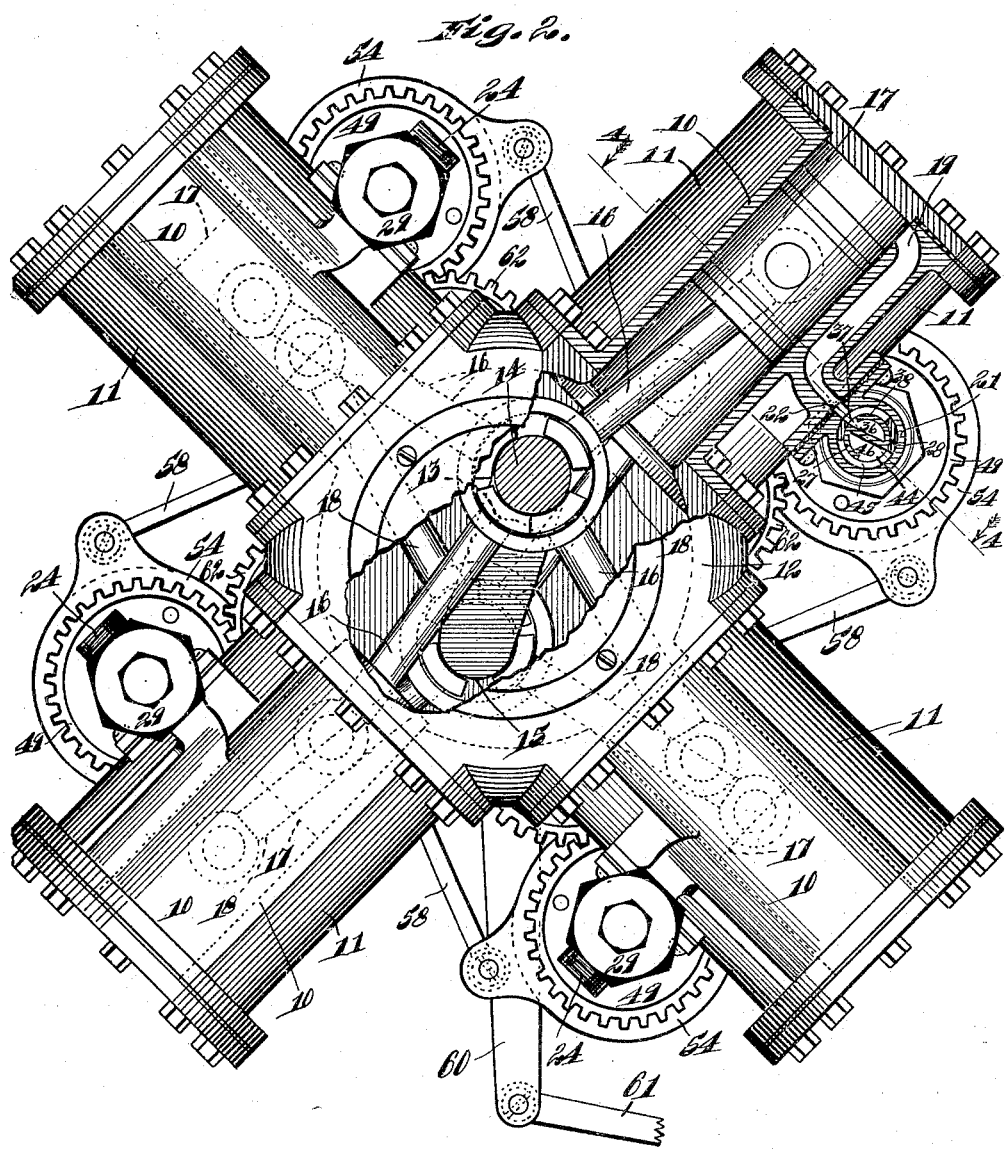

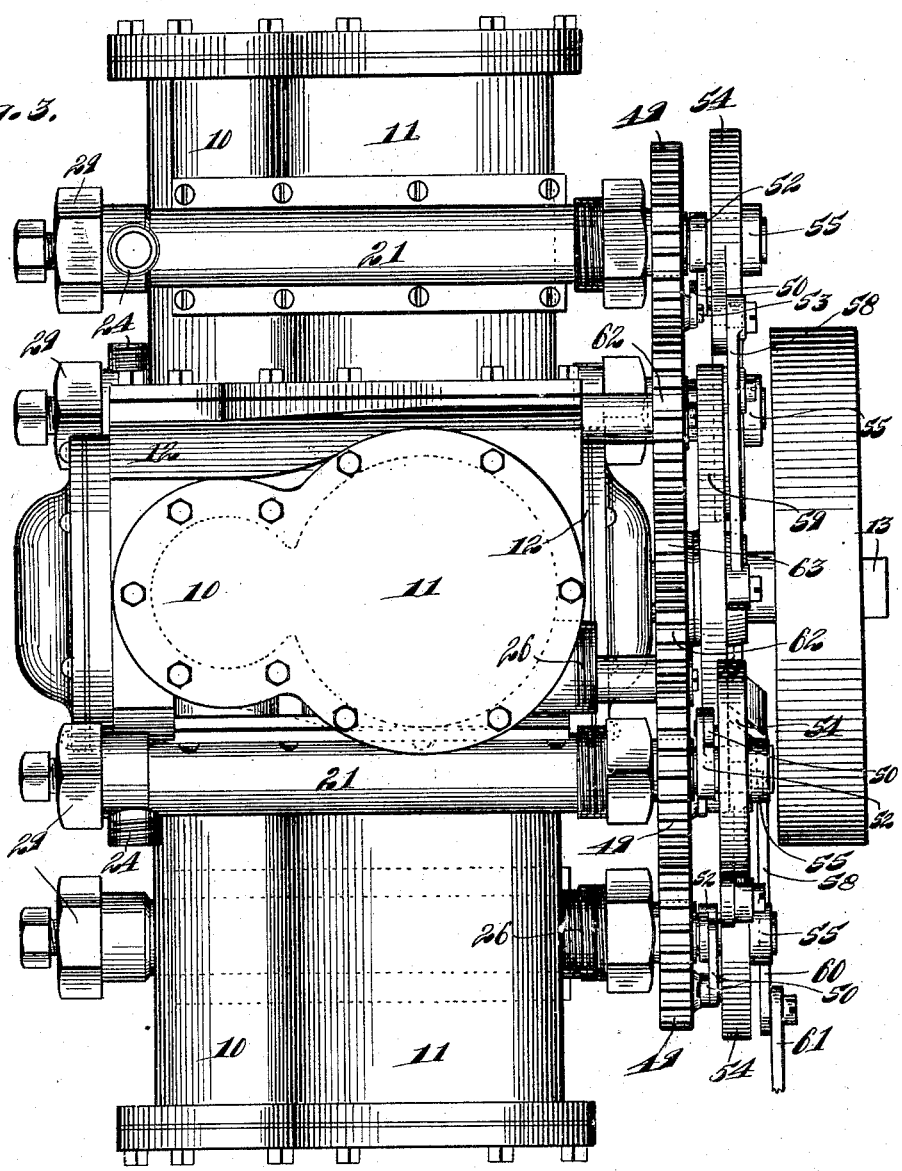

W. W. VANCE.
ROTARY VALVE FOR ENGINES.
APPLICATION FILED NOV. 19, 1914.
1,228,502.
Patented June 5, 1917.
4 SHEETS—SHEET 4.
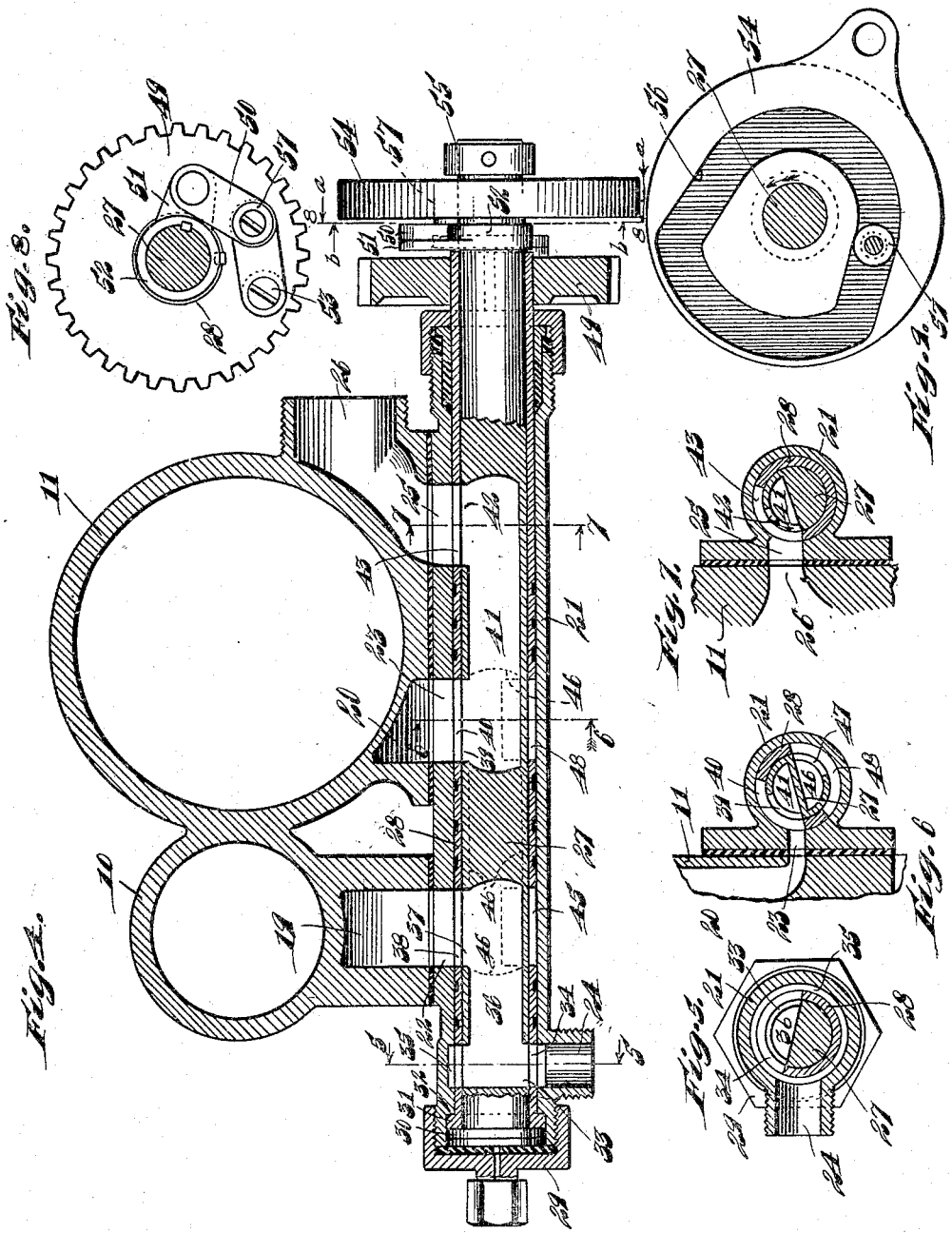

UNITED STATES PATENT OFFICE.

WILLIAM W. VANCE, OF CHICAGO, ILLINOIS.

ROTARY VALVE FOR ENGINES.

1,228,502. Specification of Letters Patent. Patented June 5, 1917.

Application filed November 19, 1914. Serial No. 872,979.

*To all whom it may concern:*

Be it known that I, WILLIAM W. VANCE, a citizen of the United States, and a resident of the city of Chicago, county of Cook, and State of Illinois, have invented certain new and useful Improvements in Rotary Valves for Engines, of which the following is a specification.

My invention relates to improvements in rotary valve mechanism for engines, especially of the compressed fluid type, and particularly steam engines.

The object of my invention is the production of valve mechanism for controlling the inlet and exhaust of an engine cylinder, which may be readily adjusted at the will of the operator in order to secure early or late cut-off, as may be desired by the operator.

A further object is the production of valve mechanism which will be of improved construction and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a front elevation of a steam engine equipped with valve mechanism embodying my invention, Fig. 2 is a partially sectional rear elevation of the engine, Fig. 3 is a side elevation thereof, Fig. 4 is an enlarged section taken on substantially line 4—4 of Fig. 2, Figs. 5, 6 and 7 are detail sections taken on lines 5—5, 6—6 and 7—7 respectively of Fig. 4, Fig. 8 is a detail section taken on line 8—8 of Fig. 4, looking in the direction of arrows *a—a*, and Fig. 9 is a detail section taken on line 8—8 of Fig. 4, looking in the direction of arrows *b—b*.

The preferred form of construction, as illustrated in the drawings is shown in connection with a steam engine which consists of a plurality of radially disposed cylinders. Said cylinders are arranged in pairs, each pair comprising a high pressure cylinder 10 and a low pressure cylinder 11 which are cast *en bloc*. The inner ends of the cylinders 10 and 11 are secured to the crank casing 12 in which is rotatably mounted a centrally positioned crank shaft 13. Said crank shaft is formed with two oppositely disposed cranks 14 and 15, the former being in the plane of high pressure cylinders 10, and the latter in the plane of low pressure cylinders 11. The crank 14 is connected by means of piston rods 16 with pistons 17 which are mounted for reciprocation in high pressure cylinders 10. The crank 15 is correspondingly operatively connected through the medium of piston rods 18 with pistons (not shown) operating in low pressure cylinders 11, as will be readily understood. Communicating with the outer end of each of the high pressure cylinders 10 is an inlet and outlet passage 19, as clearly shown in Fig. 2, and communicating with the outer end of each of the low pressure cylinders 11 is an inlet and outlet passage 20, best shown in Figs. 4 and 6.

Coöperating with the passages 19 and 20 of each pair of cylinders 10 and 11 is a valve mechanism designed to control the inlet and outlet of said cylinders. Said valve mechanism comprises a housing 21 rigidly secured to the cylinders 10 and 11 at one side thereof, said housing being provided with ports 22 and 23 which communicate with the passages 19 and 20 respectively, as clearly shown in Figs. 4 and 6, and inlet and exhaust ports 24 and 25, the former being adapted for connection with any suitable source of steam or motive fluid supply, and the latter being in open communication with an exhaust passage 26 formed in the side of cylinder 11, as clearly shown in Fig. 4. Rotatably mounted in the housing 21 are two concentric valve members 27 and 28 arranged one within the other, the former being simply an elongated cylinder, and the latter a cylindrical sleeve, the arrangement being such that while both of said valve members may rotate in unison in the housing 21, rotary shifting relatively to each other is also permitted. Said valve members 27 and 28 are locked against longitudinal movement in housing 21, in one direction, by means of a cap 29 provided at one end of said housing, said cap engaging against the flanged end 30 of the valve member 27, said flanged end of said valve member 27 in turn engaging against the flanged end 31 of the valve member 28, and which in turn engages against an annular internal shoulder 32 formed in housing 21, as clearly shown in Fig. 4, said shoulder serving as the means of locking said valve members against longitudinal movement in the opposite direction.

Formed in one side of the valve member 28 adjacent one end thereof is a port 33 which registers with a port 34 provided in the valve member 28, as clearly shown in Figs. 4 and 5. The ports 33 and 34 are adapted for registration with the inlet or supply port 24 of housing 21, the interior of the latter being cut away to form a channel 35 in order to obtain constant communication between said inlet or supply port and the valve ports 33 and 34. Formed in the valve member 27 is a passage 36 which leads from the port 33 to a port 37 formed in said valve member for registering with a port 38 which is formed in the valve member 28, both of said ports 37 and 38 being in turn positioned for registration with the port 22 of housing 21. Formed in the same side of valve members 27 and 28 are registering ports 39 and 40 which are positioned for registration with the housing port 23, the arrangement being such that in the operation of the valve mechanism the ports 37 and 38, and 39 and 40 will simultaneously register with housing ports 22 and 23 respectively. Formed in the valve member 27 is a longitudinally extending passage 41 leading from the port 39 which terminates at its opposite end in a port 42 which is adapted for registration with a port 43 formed in the valve member 28, said ports 42 and 43 being adapted in turn for registration with housing port 25. With this arrangement then, it will be seen that, in the operation of the engine, intake to high pressure cylinder 10 will take place at the same time as low pressure cylinder 11 is exhausting.

Also formed in the valve member 27, as clearly shown in Fig. 2, is a port 44 disposed substantially diametrically opposite the port 37, the port 44 being positioned for registration with a port 45 formed in the valve member 28, said ports 44 and 45 being adapted, upon rotation of said valve members, to register with the port 22 alternately with the ports 37 and 38. Leading from the port 44 in valve member 27 is a longitudinally extending passage 46 which establishes communication between the last mentioned port and a port 47 formed in the valve member 27 for registration with a port 48 formed in the valve member 28, said ports 47 and 48 being in turn positioned for registration with the housing port 23 alternately with the ports 39 and 40, upon rotation of said valve members, as clearly shown in Fig. 6. The ports 44 and 45, and 47 and 48 are positioned at the same side of said valve members so as to be adapted to simultaneously register with the ports 22 and 23, the arrangement being such that in the operation of the engine, the high pressure cylinder 10 will exhaust into the low pressure cylinder 11 when said ports are in registration, as just mentioned.

Rotation of the valve members 27 and 28 is effected by means of a gear 49 which is secured to the protruding end of the valve member 28, a suitable packing surrounding said valve member at the point of the entry thereof into housing 21 in order to prevent leakage. The valve member 28 is operatively connected with the valve member 27 by means of a toggle 50, one end of said toggle being pivotally connected with a lug 51 projecting from a collar 52 which is keyed to the valve member 27, the other end of said toggle being pivotally connected at 53 with the adjacent side of gear 49, as clearly shown in Fig. 8. The arrangement is such, as will be seen, that said valve members are connected together in a manner to effect unisonous rotation thereof while at the same time, relative rotary shifting of the valve member 27 may be effected upon movement of the knee joint of the toggle which serves apparently to draw the ends of said toggle toward each other or to force the same from each other. Such actuation of the knee joint of the toggle is effected by means of a cam disk 54 which is loosely mounted upon the outer end of valve member 27, being held thereon by means of a stop collar 55. Formed in the inner side of cam disk 54 is an irregular cam groove 56 with which engages a roller 57 provided at the knee joint of the toggle. With this arrangement, it will be seen that upon rotation of gear 49, the travel of roller 57 in cam groove 56 will cause the knee joint of the toggle to be moved toward and from the axis of rotation, and thus secure the relative rotary shifting of the valve member 27, as above mentioned.

This relative rotary shifting of valve member 27 is utilized to move the port 37 of valve member 27 into and out of registration with the port 38, said ports being out of registration when the roller 57 is in the crest or outer portion of the cam groove 56, and in registration when said roller is in the inner or lower portion of said cam groove, the latter position of said roller being shown in Fig. 9. In the operation of the engine, the intake to high pressure cylinder 10 will continue so long as port 38 is in registration with the port 22 providing the port 37 is in registration with said port 38. Therefore, with the arrangement set forth, it will be seen that when a late cut-off is desired, the port 37 is permitted to remain in registration with the port 38 during the entire period that the latter is in registration with the port 22. If an early cut-off is desired, it is only necessary to rotatably shift the valve member 27 so as to carry the port 37 thereof out of registration with the port 38 before the latter has been moved out of registration with the housing port 22. This relative shifting of the valve member 27 takes place upon each revolution of said valve members, the exact time of shifting being dependent upon the position of the cam member 54. By adjustment of said cam member, shifting of the valve member 27 may be advanced or retarded, that is brought about earlier or later, as will be readily understood. Thus, with this arrangement, it will be seen that, through rotary adjustment of the cam member 54, the port 37 may be moved out of registration with the port 38, as early or late, as desired, in order to secure early or late cut-off of the high pressure cylinder. The ports 37 and 38 are of such proportionate widths and said valve members and cam member are so designed, timed and adjusted, that in the operation of the engine, the cut-off of the high pressure cylinder may be effected as early as one-eighth of the stroke of the piston thereof or as late as three-fourths of the stroke of the piston, and without interfering with the timing of the exhaust. The delayed cut-off is, of course, of advantage where the engine is under heavy strain, as for instance in hill climbing, since in the latter case, the delayed cut-off prevents killing of the engine. Also, the port 38 is preferably of such a width and so positioned relative to the stroke of the corresponding high pressure cylinder piston, that intake of steam will occur just before the piston reaches its upper or outer terminal of movement. With this arrangement a small quantity of steam will be admitted to the cylinder before the piston reaches its outer terminal of movement, the steam thus admitted serving as a cushion for the piston, preventing pounding and insuring evenness and steadiness in the operation of the engine.

Each pair of cylinders of the engine is equipped with valve mechanism, as above described, the cam members 54 of the valve mechanisms of the various pairs of cylinders being connected by means of rods 58 with a disk 59 which is mounted for rotary adjustment upon the crank shaft 13. Said disk 59 is provided with a rocker arm 60 with which connects an operating rod 61 which may be connected in any suitable manner for manual control by the operator of the engine, or by the driver of the vehicle in which the same is installed. With this arrangement, it will be seen, that upon actuation of the rod 61 all of the cam members of the valve mechanisms of the engine will be simultaneously adjusted. Also, all of the gears 49 of the valve mechanisms are connected by means of idler gears 62 with a common driving gear 63 which is fixed to the crank shaft 13, the latter thus serving as a means of driving the various valve mechanisms in the operation of the engine.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with two continuously rotatable relatively rotatably shiftable valve members, of means for rotatably shifting said valve members relatively to each other during rotation thereof, said last mentioned means comprising a plurality of pivotally connected links connecting said valve members; and means for tilting said links, substantially as described.

2. The combination with two continuously rotatable relatively rotatably shiftable valve members, of means for rotatably shifting said valve members relatively to each other during rotation thereof, said last mentioned means comprising a toggle mechanism connecting said valve members; and means for actuating said toggle mechanism, substantially as described.

3. The combination with two continuously rotatable relatively rotatably shiftable valve members, of means for rotatably shifting said valve members relatively to each other during rotation thereof, said last mentioned means comprising a toggle mechanism connecting said valve members; means for operating said toggle mechanism; and manually controlled means for regulating the operation of said toggle mechanism, substantially as described.

4. The combination with two continuously rotatable relatively rotatably shiftable valve members, of cam operated means for rotatably shifting said valve members relatively to each other during rotation thereof, substantially as described.

5. The combination with two continuously rotatable relatively rotatably shiftable valve members, of means for rotatably shifting said valve members relatively to each other during the rotation thereof, said last mentioned means comprising a plurality of pivotally connected links connecting said valve members; and a cam for actuating said links, substantially as described.

6. The combination with two continuously rotatable relatively rotatably shiftable valve members, of means for rotatably shifting said valve members relatively to each other during the rotation thereof, said last mentioned means comprising a toggle mechanism connecting said valve members; and a cam engaging with the knee of said toggle mechanism for actuating the latter, substantially as described.

7. The combination with two continuously rotatable relatively rotatably shiftable valve members, of means for rotatably shifting said valve members relatively to each other during the rotation thereof, said last mentioned means comprising a toggle mechanism connecting said valve members; and an adjustably mounted cam engaging with the knee of said toggle mechanism for actuating the latter, substantially as described.

8. The combination with two continuously rotatable relatively rotatably shiftable valve members, of means for rotatably shifting said valve members relatively to each other during the rotation thereof, said last mentioned means comprising a toggle mechanism connecting said valve members; and a rotatably adjustable member having an irregular cam groove engaging with the knee of said toggle mechanism for actuating the latter, substantially as described.

9. The combination with two continuously rotatable relatively rotatably shiftable valve members; of means for rotatably shifting said valve members relatively to each other during the rotation thereof, said last mentioned means comprising a toggle mechanism connecting said valve members; a cam operatively engaging with said toggle mechanism for actuating the latter, said cam being rotatably adjustable whereby the period of relative shifting of said valve members may be varied; and manually operable means for rotatably adjusting said cam, substantially as described.

10. The combination with two continuously rotatable relatively rotatably shiftable valve members; of means for rotatably shifting said valve members relatively to each other during the rotation thereof, said last mentioned means comprising a toggle mechanism connecting said valve members; a cam operatively engaging with said toggle mechanism for actuating the latter, said cam being rotatably adjustable whereby the period of relative shifting of said valve members may be varied; manually operable means for rotatably adjusting said cam, said last mentioned means comprising a rotatable member; and a link connecting said last mentioned member with said cam, substantially as described.

11. The combination with an engine comprising a plurality of cylinders, and a valve coöperating with each of said cylinders comprising two continuously rotatable relatively rotatably shiftable valve members, of levers connecting the valve members of each of said valves for rotatably shifting the same relatively to each other during rotation thereof; means for actuating the levers coöperating with each of said valves, said means being rotatably adjustable whereby the period of relative shifting of the valve members of each valve may be varied; and means for simultaneously rotatably adjusting said last mentioned means of all of said valves, substantially as described.

12. The combination with an engine comprising a plurality of cylinders, and a valve coöperating with each of said cylinders comprising two continuously rotatable relatively rotatably shiftable valve members, of a toggle connecting the valve members of each of said valves for rotatably shifting the same relatively to each other; means for actuating the toggle coöperating with each of said valves, said means being rotatably adjustable whereby the period of relative shifting of the valve members of each valve by the toggle coöperating therewith may be varied; and manually operable means for simultaneously rotatably adjusting said last mentioned means of all of said valves, substantially as described.

13. The combination with an engine comprising a plurality of cylinders, and a valve coöperating with each of said cylinders comprising two continuously rotatable relatively rotatably shiftable valve members, of a toggle connecting the valve members of each of said valves for rotatably shifting the same relatively to each other; a cam engaging with the knee of each toggle for actuating the latter, said cam being rotatably adjustable whereby the period of relative shifting of the valve members engaged by the corresponding toggle may be varied; and manually operable means for simultaneously rotatably adjusting said cams of all of said valves, substantially as described.

14. The combination with two continuously rotatable relatively shiftable valve members, of means for rotatably shifting said valve members relatively to each other during rotation thereof, substantially as described.

15. A valve mechanism of the class described comprising a housing; a pair of concentric valve members arranged one within the other rotatably mounted in said housing and rotatably shiftable relatively to each other, said valve members having ports adapted for registration with each other; and means for rotating said valve members and simultaneously advancing or retarding one of said members, substantially as described.

16. A valve mechanism of the class described comprising a housing having a port therein; a pair of concentric valve members arranged one within the other rotatably mounted in said housing and rotatably shiftable relatively to each other, said valve members having ports adapted for registration with each other and with said housing port; means for simultaneously rotating said valve members; and means for periodically rotatably shifting said valve members during rotation to move the ports thereof into or out of registration with each other, substantially as described.

17. A valve mechanism of the class described comprising a housing having a port therein; a pair of concentric valve members arranged one within the other rotatably mounted in said housing and rotatably shiftable relatively to each other, said valve members having ports adapted for registration with each other and with said housing port; means for simultaneously rotating said valve members; means for periodically rotatably shifting said valve members during rotation to move the ports thereof into or out of registration with each other; and means for adjusting said last mentioned means in order to control the duration of the period in which both of said valve member ports will be in communication with said housing port, substantially as described.

18. The combination with an engine cylinder, of valve mechanism for controlling the passage of motive fluid to said cylinder, said valve mechanism comprising a housing having a port communicating with the interior of said cylinder; a pair of concentric valve members arranged one within the other rotatably mounted in said housing and rotatably shiftable relatively to each other, said valve members having ports adapted for registration with each other and with said housing port; a passage in the inner one of said valve members communicating with the port therein and a motive fluid supply; means for simultaneously rotating said valve members; and means for periodically rotatably shifting said valve members during rotation to move the ports thereof into and out of registration with each other, substantially as described.

19. The combination with an engine cylinder, of valve mechanism for controlling the passage of motive fluid to said cylinder, said valve mechanism comprising a housing having a port communicating with the interior of said cylinder; a pair of concentric valve members arranged one within the other rotatably mounted in said housing and rotatably shiftable relatively to each other, said valve members having ports adapted for registration with each other and with said housing port; a passage in the inner one of said valve members communicating with the port therein and a motive fluid supply; means for simultaneously rotating said valve members; and means for periodically rotatably shifting the inner valve member relatively to the outer valve member during rotation of said members to move the ports of the latter into and out of registration with each other, substantially as described.

20. The combination with an engine cylinder, of valve mechanism for controlling the passage of motive fluid to said cylinder, said valve mechanism comprising a housing having a port communicating with the interior of said cylinder; a pair of concentric valve members arranged one within the other rotatably mounted in said housing and rotatably shiftable relatively to each other, said valve members having ports adapted for registration with each other and with said housing port; a passage in the inner one of said valve members communicating with the port therein and a motive fluid supply; means for simultaneously rotating said valve members; means for periodically rotatably shifting the inner valve member relatively to the outer valve member during rotation of said members to move the ports of the latter into and out of registration with each other; and means for adjusting said last mentioned means in order to control the duration of the period in which both of said valve member ports will be in communication with said housing port, substantially as described.

21. The combination with an engine having two cylinders of valve mechanism for controlling the passage of fluid to and from said cylinders, said valve mechanism comprising a housing having two ports each communicating with the interior of one of said cylinders; a valve member rotatably mounted in said housing, said valve member having a pair of inlet and outlet ports for coöperation with each of said housing ports and adapted, upon rotation of said valve member, to alternately register with the corresponding housing port, the outlet port of said valve member coöperating with one of said cylinders and the inlet port of said valve member coöperating with the other of said cylinders being positioned for simultaneous rotation with the corresponding housing ports; a passage in said valve member connecting said last mentioned outlet and inlet ports, the inlet port of said valve member coöperating with said first mentioned cylinder and the outlet port of said valve member coöperating with said second mentioned cylinder being positioned for simultaneous rotation with the corresponding housing ports; a motive fluid passage in said valve member communicating with an exhaust passage in said valve member communicating with said last mentioned outlet port; a tubular valve member mounted upon said first mentioned valve member, said valve members being mounted for simultaneous rotation and being rotatably shiftable relatively to each other, said outer valve member having ports adapted for registration with those of said inner valve member; and means for rotating said valve members and simultaneously advancing or retarding one of said valve members, substantially as described.

In testimony whereof I have signed my name to this specification in the presence of two subscribing witnesses.

WILLIAM W. VANCE.

Witnesses:
JOSHUA R. H. POTTS,
ARTHUR A. OLSON.

Copies of this patent may be obtained for five cents each, by addressing the "Commissioner of Patents, Washington, D. C."